United States Patent

[11] 3,574,243

[72] Inventor Edward E. Yaste
 Burlingame, Calif.
[21] Appl. No. 750,186
[22] Filed Aug. 5, 1968
[45] Patented Apr. 13, 1971
[73] Assignee Powerflow Engineering and Equipment
 Company, Inc.
 Palo Alto, Calif.

[54] DRIPSTICK TOOL
 4 Claims, 6 Drawing Figs.
[52] U.S. Cl...................................................... 7/14.6,
 73/298
[51] Int. Cl...................................................... B25f 1/04

[50] Field of Search.......................................... 7/14.6, 1;
 81/13, 3.42; 73/298; 145/50—3

[56] References Cited
 UNITED STATES PATENTS
 3,055,217 9/1962 Vogt............................. 73/298
 3,182,697 5/1965 Bonewits...................... 145/50

*Primary Examiner*—Travis S. McGehee
*Attorney*—Townsend and Townsend

ABSTRACT: A tool for withdrawing and replacing an aircraft dripstick between a rotationally secured first position within the underside of an aircraft and a second position of fuel volume indication without spillage of fuel.

PATENTED APR 13 1971
3,574,243
SHEET 1 OF 2
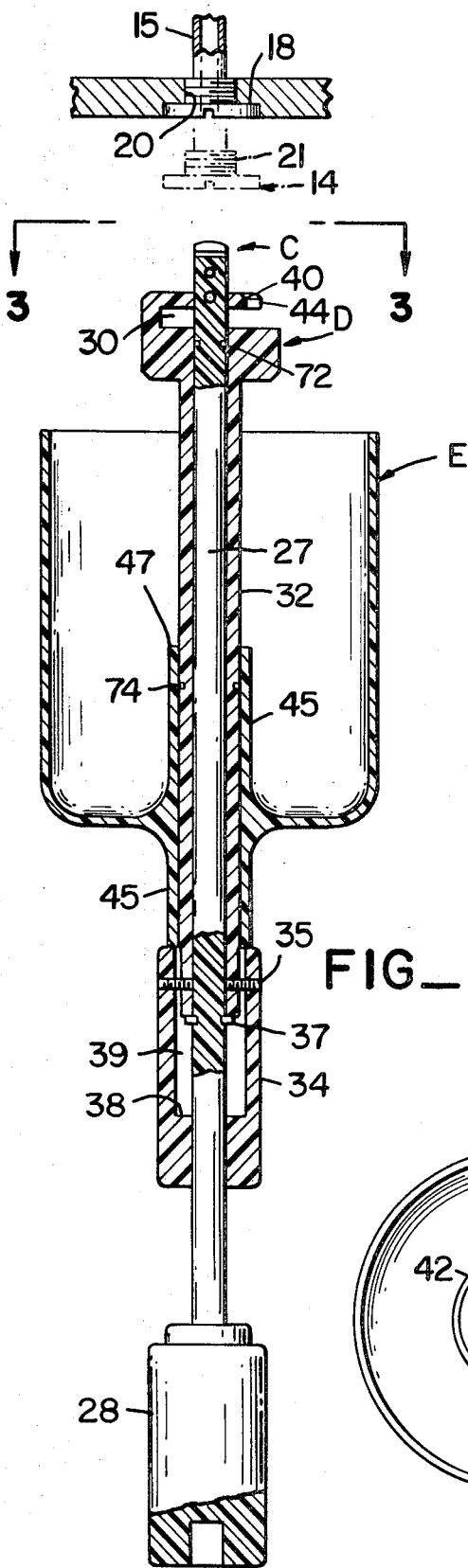
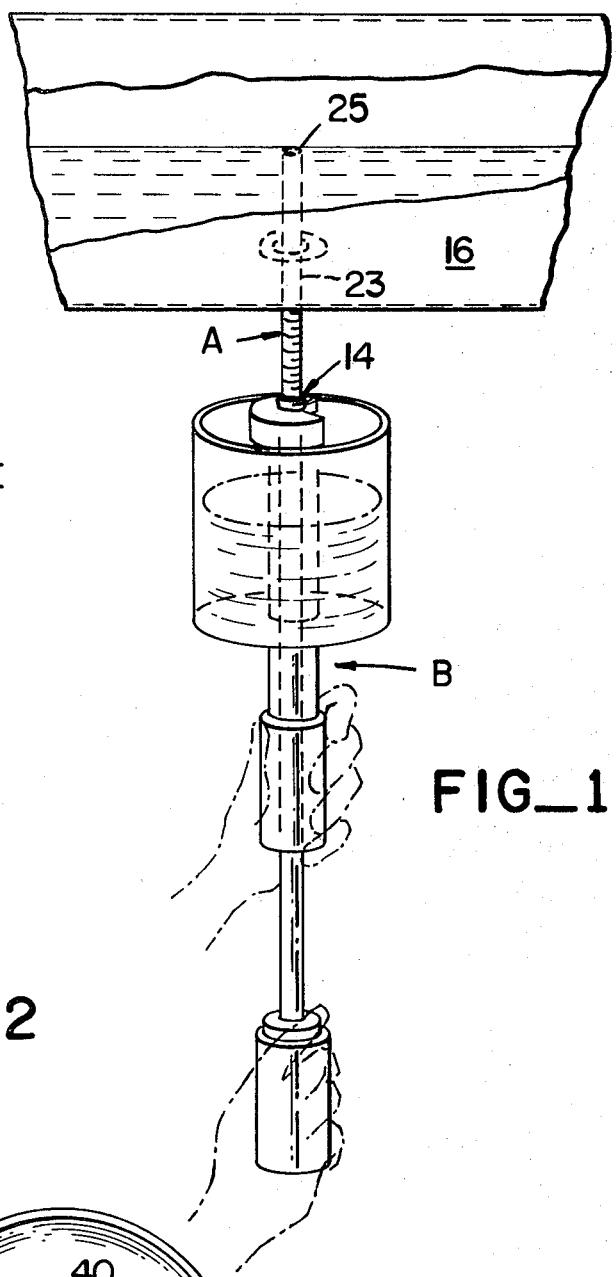
FIG_1
FIG_2
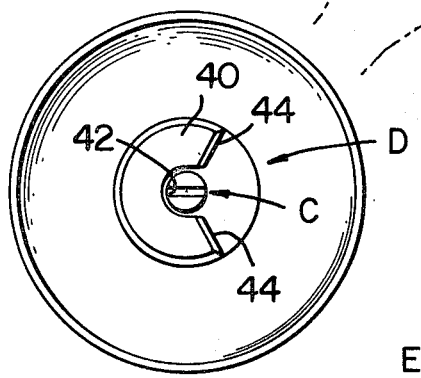
FIG_3
INVENTOR.
EDWARD E. YASTE
BY
Townsend and Townsend
ATTORNEYS

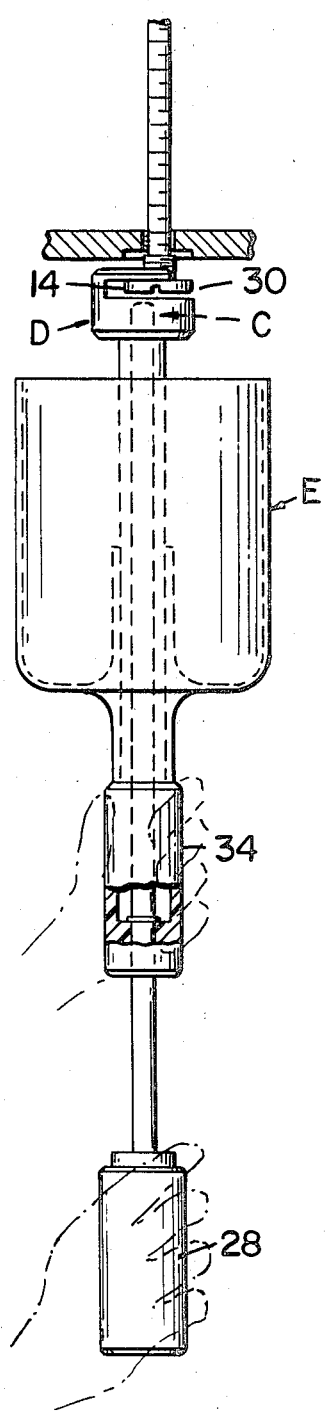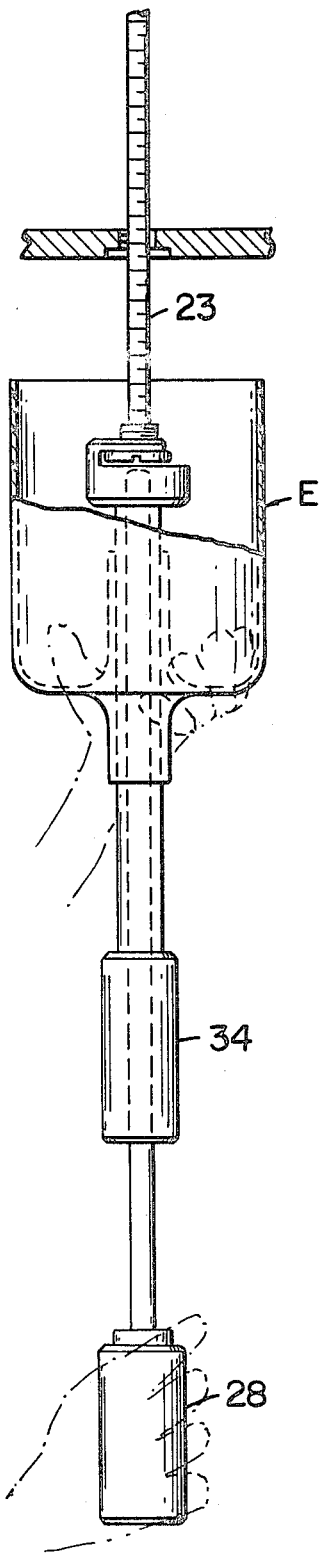
FIG_4
FIG_5
FIG_6
INVENTOR.
EDWARD E. YASTE
BY
Townsend and Townsend
ATTORNEYS

DRIPSTICK TOOL

This invention relates to a tool for manipulating an aircraft dripstick without the spillage of inflammable and corrosive fuel.

Conventional aircraft are equipped with dripsticks for the measurement of fuel within their tanks. These dripsticks have a hollow interior, an exposed threaded cap, and are mounted from the bottom of aircraft fuel tanks so as to extend upwardly interior of the tank through the surface of the fuel contained therein. When measurement of the aircraft fuel is desired, the dripstick is rotated out of threaded engagement within the underside of the aircraft and thereafter pulled downwardly. The hollow interior of the dripstick is drawn to a position immediately adjacent the surface of the fuel within the fuel tank. In this position, the fuel flows through the dripstick and discharges through the downward end, indicating the level of fuel contained within the tank.

The dripstick, because it performs its measuring function by permitting fuel outflow, has the disadvantage of allowing fuel to be discharged when lowered to measuring positions. Such dripsticks are commonly disengaged by a screwdriver and thereafter pulled downwardly by hand. When fuel is discharged from the dripstick in its position of fuel indication, it flows on the operator and the runway, not only causing skin and eye irritations but also causing a fire hazard.

An object of this invention is to provide a dripstick-manipulating tool for reading dripsticks without the discharge of fuel on ground crew personnel or the runway. The tool includes a protruding screwdriver blade, a hooked grasping member and a cup. The screwdriver blade rotationally unsecures the threaded cap of the dripstick from the underside of the aircraft. Thereafter, the hooked member slides over the unsecured dripstick cap allowing the dripstick to be pulled downwardly to its position of fuel indication. The cup, mounted about the hooked member and screwdriver blade, catches fuel discharged from the dripstick, thereby preventing spillage.

An advantage of the dripstick tool is that it can be manipulated in an overhead position. To this end, the tool is provided with a transparent cup with its open lip disposed upwardly and about the screwdriver blade and the hooked member. Upon movement of the dripstick to a position of fuel indication, the flow of fuel from the dripstick into the cup can be readily observed through the cup walls.

An additional advantage of the invention is that the screwdriver, hooked member and cup are all mounted in slidable and telescoping relation permitting advancement or retraction of the tool elements towards and away from the dripstick. This sliding and telescoping relation permits sequential movement of the screwdriver, hooked member, and cup into and out of proximity with the dripstick.

A further advantage of the invention is that the threaded dripstick cap can be grasped by the hooked member, and secured partially within the underside of the aircraft before its release from the hooked member. This function prevents the dripstick from falling while the cap is positioned for threaded engagement in the underside of the aircraft.

Other objects, features and advantages of the present invention will be more apparent after referring to the following specification and attached drawing in which:

FIG. 1 is a perspective view of an aircraft wing shown in partial section with a dripstick held in its position of fuel indication by a dripstick tool;

FIG. 2 is an expanded side elevation section of the dripstick end and tool;

FIG. 3 is an end elevation section of the dripstick tool along lines 3—3 of FIG. 2;

FIG. 4 is a side elevation of the dripstick and dripstick tool with the cap member of the dripstick grasped within the hook member;

FIG. 5 is an elevation view of the dripstick drawn to a position of fuel indication and specifically showing the position of the cup to prevent spillage of fuel; and FIG. 6 is a side elevation of the dripstick being returned to its secured position within the underside of the aircraft.

With reference to FIG. 1, dripstick A is shown being held by dripstick tool B at threaded cap 14 in a position of fuel indication. Tool B includes a screwdriver blade C, a hooked member D and a fuel collection cup E. In operation, screwdriver blade C is used to rotate the dripstick at threaded cap 14 into and out of its secured position in the underside of the aircraft. When the dripstick has been screwed out of the secured position, hooked member D grasps threaded cap 14 and permits the dripstick to be moved downwardly to a position of fuel indication. At this latter position of fuel indication, fuel flows from the dripstick and is caught and collected by fuel collection cup E.

To understand fully the function of the tool B, it is necessary to describe briefly the function of dripstick A. Referring to FIGS. 1 and 2, dripstick A is shown having a threaded cap 14 and a hollow tube 15. The tube extends upward interiorly of a fuel tank 16 from the underside of an aircraft. Tube 15 slides into and out of tank 15 through a tank bottom fitting 18. This fitting 18 defines a threaded recess 20 for receiving threads 21 of cap 14 for securing the dripstick within the aircraft.

Dripstick tube 15 on its outside is marked with indicia 23. This indicia is observed when exposed below fitting 18 and equilibrates the amount of fuel in the tank with the level of the fuel in the tank.

To read the dripstick, it is first disengaged from fitting 18 at threaded cap 14. Thereafter the dripstick is pulled downwardly until the upward end is immediately adjacent the surface of fuel within the tank. When the dripstick is in this position, fuel flows from the dripstick at cap 14 due to the immersion of the hollow tube below the level of fuel within tank 16. When fuel flows at cap 14, downward movement of the dripstick is stopped and indicia 23 read to determine the amount of fuel within the tank.

In its construction, tool B is provided with a cylindrical shaft 27 having screwdriver blade C affixed at one end and an integrally formed handle 28 affixed at the opposite end. The shaft 27 transmits a turning force applied to the typically knurled surface of handle 28 to screwdriver blade C. The shaft also serves as the central member about which hooked member D and fuel collection cup E are slidably mounted.

Hooked member D grasps dripstick A at threaded cap 14. Member D is partially bifurcated by a defined notch 30 forming a cavity within member D into which threaded cap 14 of dripstick A can fit.

Extending downwardly from member D about shaft 27 there is a tubular shaft 32. Shaft 32 is integral with hooked member D. This shaft provides the surface along which cup E is slidably mounted, and is connected at its lower end to lower handle 34 by Allen screws 35.

Hooked member D slides relative to screwdriver blade C. Such sliding occurs between a first position where the screwdriver blade protrudes outwardly and beyond hooked member D and a second position wherein the screwdriver blade C is recessed below notch 30 of member D.

This sliding movement of the screwdriver blade is limited by a retainer ring 37 affixed to shaft 27. When member D slides downwardly with respect to screwdriver blade C, ring 37 contacts the bottom of shaft 32 limiting the downward movement; conversely when member D slides upwardly with respect to screwdriver blade C, ring 37 contacts the end 38 of an enlarged concentric bore 39 within lower handle 34 limiting such upward movement.

When screwdriver blade C is withdrawn below notch 30 of hooked member D, threaded cap 14 attached to dripstick A must pass into and out of notch 30. In order to allow such passage, the upper segment 40 of hooked member D is configured with a receiving aperture 42 into and out of which threads 21 of cap 14 may slide. To permit such a sliding engagement with minimum effort, aperture 42 has diverging gathering surfaces 44 defined in upper segment 40 as shown in FIG. 3.

Transparent fuel collection cup E is integrally formed with and attached to a tubular shaft 45. Shaft 45 extends above and below the bottom surface of the cup, and slides over the outside surface of tubular shaft 32 between upper handle 34 and hooked member D. This shaft 45 affixed to cup E terminates at the point 47 below the upper lip of the cup so as to permit the cup to slide upwardly about member D to confine the fluid discharged from dripstick A.

In order to prevent fuel from penetrating between the outside of shaft 27 affixed to screwdriver blade C and the inside of tubular shaft 32 affixed to member D, a sealing ring 72 is installed. Likewise, to prevent fuel from penetrating from between the outside of shaft 32 and the inside of shaft 45, there is installed a second sealing ring 74.

With reference to FIGS. 2, 4, 5 and 6 the operation of the dripstick tool in conjunction with the dripstick can be readily understood. As illustrated in FIG. 2, screwdriver blade C will first be moved above hooked member D by sliding lower handle 28 upwardly towards upper handle 34. In this position, blade C will engage a complementary aperture in threaded cap 14 and be rotated to disengage threads 21 from tank fitting 18.

When cap 14 of the dripstick is disconnected, handle 28 will be moved away from upper handle 34 to draw blade C below notch 30 of hooked member D. Thereafter, the tool will be manipulated to permit cap 14 to slide along the upper surface of hooked member D and into the grasp at notch 30. This position is illustrated in FIG. 4.

Following this the dripstick will be moved downwardly to its position of fuel indication. As this downward movement is made, cup E will be moved upward and about threaded cap 14 to the position of FIG. 5. In this position, fuel discharging from the dripstick will be confined in the cup.

The transparent material of cup E permits the operator to observe instantly the first flow of fuel. The operator of the tool will then halt the downward movement and read indicia 23 to determine the fuel within tank 16.

To return the dripstick to its secured position in the underside of the aircraft, tool B will be moved upwardly until threads 21 of dripstick A contact the complementary threads 20 within tank fitting 18. Thereafter, lower handle 28 may be moved upwardly relative to handle 34 to advance screwdriver blade C into threaded cap 14 while it is still held within hooked member D.

In FIG. 6, it may be noted that upper segment 40 of hooked member D has a thickness less than the distance by which threads 21 protrude upwardly from threaded cap 14. This thickness of the upper segment 40 permits the dripstick A to be partially secured before release from hook member D.

Blade C is then rotated by handle 28 so as to partially engage threads 21 of fitting 18. Thereafter, the grasping member D is moved to release threaded cap 14 and the securing is completed by screwdriver blade C in the advanced position of FIG. 2.

Although the foregoing invention has been described in some detail by way of illustration and example for purposes of clarity of understanding, it is understood that certain changes and modifications can be practiced within the spirit of the invention as limited only by the scope of the appended claims.

I claim:

1. A tool for manipulating an aircraft dripstick and collecting fuel spillage from the dripstick comprising: first means for disconnecting said dripstick from said aircraft; second means for lowering said dripstick to its position of fuel indication; third means for collecting fuel spillage when said dripstick is lowered; and, fourth means operably interconnecting said first, second, and third means; each of said first, second and third means slidably mounted with respect to the other of said first, second and third means.

2. Apparatus for removably securing a dripstick comprising: coupling means for disconnecting said dripstick; grasping means for attachment to said dripstick when said dripstick is at least partially unsecured; cup means mounted to said grasping means, the open end of the cup means facing toward said grasping means; means for operably connecting said coupling means and said grasping means for movement between a first position where said coupling means engages said dripstick and a second position where said coupling means and said grasping means engage said dripstick.

3. Apparatus according to claim 2 and wherein said cup is movable relative to said grasping means to and from a position wherein the lip of said cup is disposed about said grasping means.

4. Apparatus according to claim 1 and wherein said interconnecting means comprises means for telescopically joining said first means and second means and means for telescopically joining said second means and said third means.